Apr. 3, 1923.
J. A. BEDDINGFIELD
1,450,786
AUTOMOBILE TIRE RIM
Filed Oct. 10, 1921
2 sheets-sheet 1
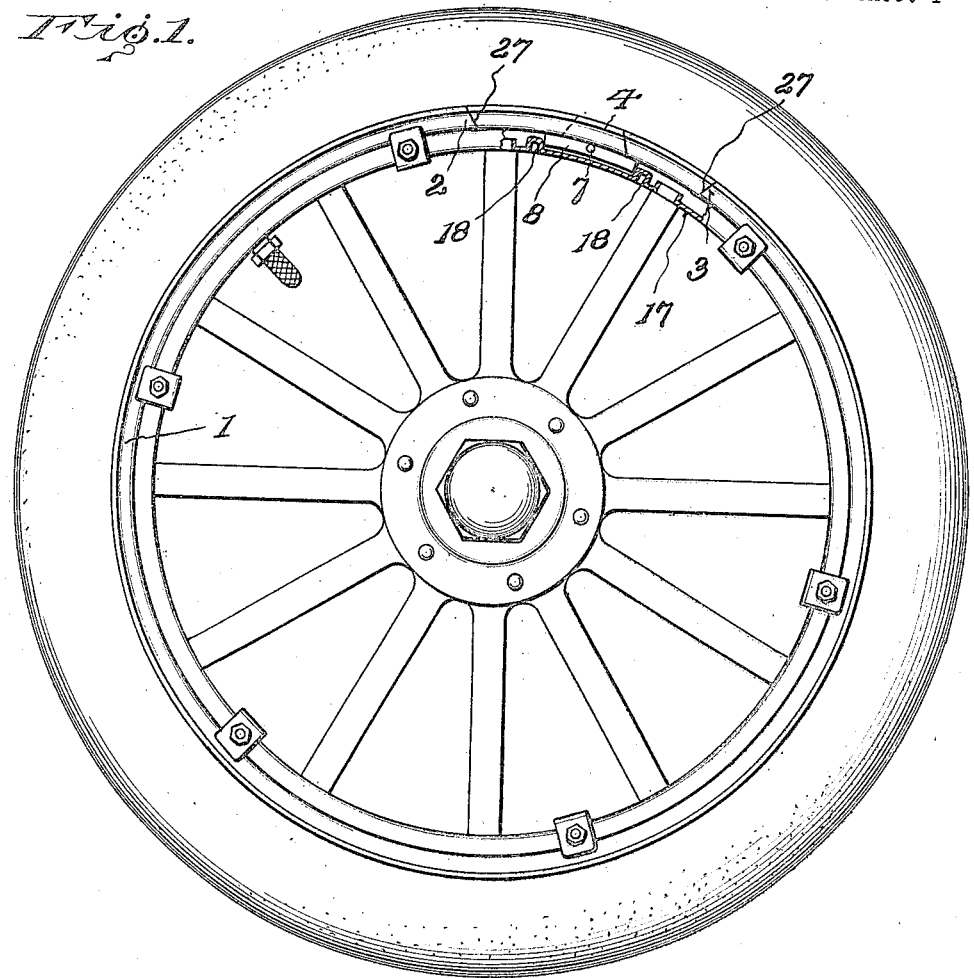
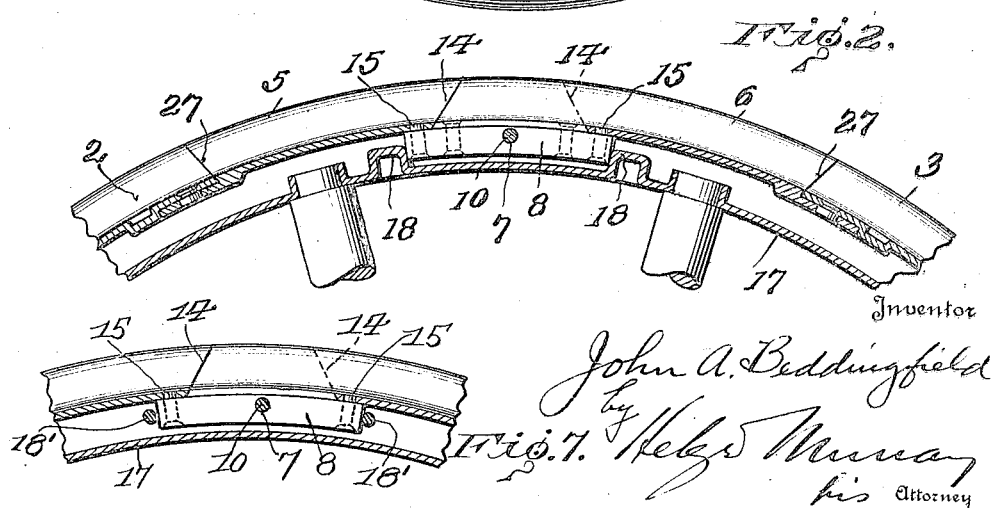
Inventor
John A. Beddingfield
by
his Attorney Apr. 3, 1923.
J. A. BEDDINGFIELD
1,450,786
AUTOMOBILE TIRE RIM
Filed Oct. 10, 1921
2 sheets-sheet 2
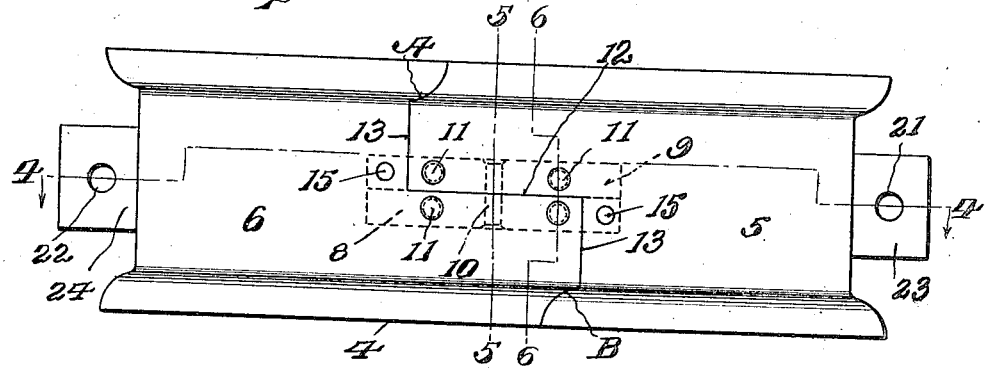
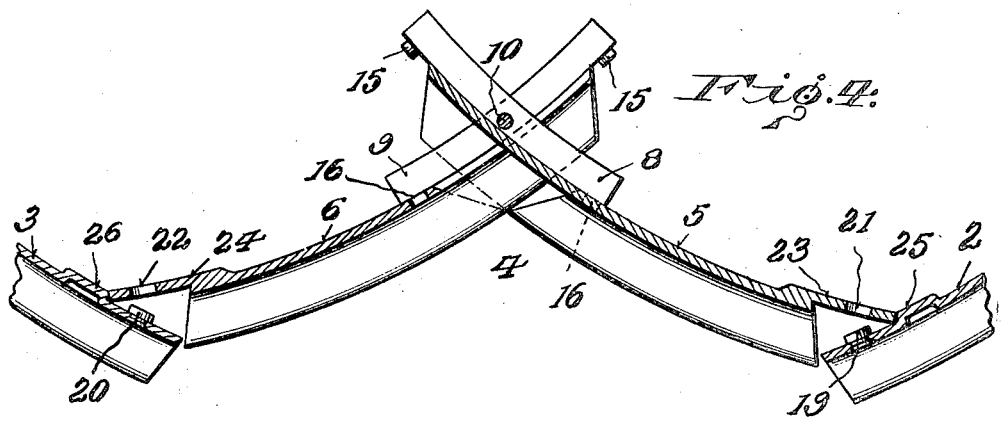
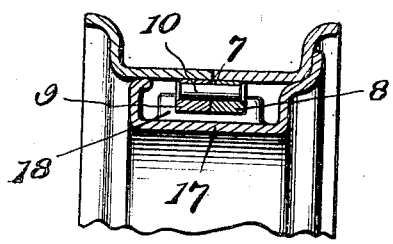
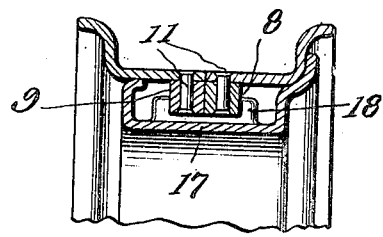
Inventor
John A. Beddingfield
By Helge Murray
his Attorney Patented Apr. 3, 1923.

1,450,786

UNITED STATES PATENT OFFICE.

JOHN A. BEDDINGFIELD, OF FORT VALLEY, GEORGIA.

AUTOMOBILE TIRE RIM.

Application filed October 10, 1921. Serial No. 506,737.

*To all whom it may concern:*

Be it known that I, JOHN A. BEDDINGFIELD, a citizen of the United States, residing at Fort Valley, in the county of Houston and State of Georgia, have invented certain new and useful Improvements in Automobile Tire Rims, of which the following is a specification.

My invention relates to automobile rims, and more particularly stated contemplates the production of a rim adapted for use upon hollow metal types of fellies.

An object of the present invention is to produce a rim consisting of a relatively permanent or non-collapsible rim section, and a detachable rim section therefor, said detachable rim section being formed with a hinge joint adapted to fit a hollow metal felly, and also afford a smooth and uninterrupted support for the tire.

Another object of my invention is to provide a strong hinge joint for the detachable rim section which will sustain maximum lateral and other strains, means being provided for locking the joint against movement, and reducing the strain upon the pivot pin of the hinge joint.

A further object of the invention is to provide a hinge joint for the detachable rim section in which the said joint acts as the driving lug when positioned upon the hollow felly.

A still further object of my invention is to form the inner ends of the hinged sections in staggered or steplike relation for facilitating the manufacture of the joint in producing a smooth and neat fitting joint from which there is comparatively little wear imparted to the tire.

With these and other objects in view my invention further consists in the construction and arrangement of the associated parts hereinafter described and pointed out in the appended claims.

In the accompanying drawings wherein is illustrated an embodiment of my joint:

Fig. 1 is a side view of my rim applied to a hollow type of automobile rim, a portion of the latter being shown in section;

Fig. 2 is a fragmentary and enlarged sectional view through the detachable rim section and joint shown in place upon the felly.

Fig. 3 is a plan view of the detachable rim section;

Fig. 4 is a sectional view showing the detachable rim section in retracted or broken position with relation to the ends of the non-collapsible rim section;

Fig. 5 is a transverse sectional view on the line 5—5 of Fig. 3 through the pivot pin of the joint; and Fig. 6 is a similar view on the line 6—6 of Fig. 3.

Fig. 7 is a detail view showing the bars 8 and 9 welded to the rim sections and forming a driving lug which is interposed between two ordinary rim bolts passing through the side walls of the felly.

The present invention involves primarily the design of a hinge joint for the detachable rim section wherein the inner ends of the hinged sections are reinforced and locked together to form a support for the tire equal in strength to the ordinary rim. The end of each inner section is interlocked with the adjoining opposite section when the detachable section is extended, said interlocking connection being easily uncoupled when the rim section is broken or retracted.

Referring to the drawings in which similar reference characters designate corresponding parts in the several views, the relatively permanent or non-collapsible rim section 1 is formed with an open segmental portion or gap between the ends 2 and 3 thereof for the reception of the collapsible and detachable rim section 4.

The detachable rim section is formed of sections 5 and 6 held together intermediate their ends by means of the pivotal or hinge connection 7. The hinge connection is located centrally of the base portion of the rim sections 5 and 6, and includes associated bars or straps 8 and 9 arranged in parallel, and adapted to receive the pivot pin 10. The pin 10 is located beneath the tire supporting surface of the rim sections and is arranged relatively close to the under face of said rim sections. The ends of the pin may be riveted over as shown in Fig. 5, or secured in any other manner.

Bars 8 and 9 are secured to the rim sections 5 and 6 by means of rivets 11, or they may be welded or integrally connected as will be understood. These bars or straps are arcuate in shape and conform to the curvature of the rim sections. They are preferably rectangular or square in cross-section and of a length sufficient to extend beneath the entire joint and form a reinforced support. Their association in close parallel arrangement prevents any tendency of the joint to move laterally.

The bars 8 and 9 are arranged adjacent each other so that their contiguous inner faces abut in a plane centrally of the rim sections and the longitudinal joint of said sections.

The inner ends of the sections 5 and 6 are cut longitudinally of the base of the rim as indicated at 12, and transversely or at an angle thereto, as indicated at 13, the latter cut extending into the side flanges of the rim and forming the angular joints 14 as shown for example in Fig. 2. The joints formed by the abutting ends are offset or in staggered relation, one abutted joint upon one side of the rim being indicated by the reference letter A, and the other joint upon the other side of the rim by the reference letter B. The respective tire supporting surfaces of the inner ends of the members 5 and 6 are likewise staggered, one side portion thereof terminating short of the opposite side portion as shown. The sides or beads of the tire are supported upon the base of the rim adjacent the side flanges, and it is to prevent a direct or immediate opposite transverse strain upon the beads that the joints A and B are staggered. The strains of the joint are therefore distributed at points obliquely located as distinguished from points in the tire immediately opposite.

It is desirable to locate the longitudinal joint centrally of the base of the rim sections, so as to provide a maximum tire supporting surface. The transverse joints are sufficiently remote from each other to insure the distribution of the strains and permit of an easy operation of the joint when being extended or broken.

The arrangement of the bars 8 and 9 affords the provision of a comparatively small hinge joint which is wholly removed from possible contact with the tire. By reference to Fig. 3 it will be seen that a smooth and continuous tire supporting surface is provided from the present construction of staggered joint.

The ends of the bars 8 and 9 project beyond the inner ends of the rim sections and are provided with locking devices in the form of pins 15. Openings 16 are provided in the respective rim sections and are designed to receive the locking pins 15 when the detachable section is expanded in place as best shown in Fig. 2. The pin and opening connections forming the locking means for the inner ends of the rim sections, are located radially with relation to the pivotal connection 7, whereby the pins 15 fit snugly within the openings 16 and positively lock the rim sections against movement and prevent any tendency of said sections to rattle. By this construction the strain upon the pivot pin is reduced to a minimum and the size of the pivotal connection can be made correspondingly small.

In manufacture I have found my present type of detachable rim section and hinge joint to be practical, in that the step-like forming of the inner ends of the rim sections can be quickly produced, and the bars 8, 9, and pivot pin 10 readily associated to complete the joint. In addition to forming a simple and neat joint the bars 8 and 9 when alined in parallel form the driving means for the rim.

My detachable rim section is shown applied to a felly 17 of the hollow metal type which may be of the usual construction. In the base of the felly I form two lugs 18 between which the bars 8 and 9 of the hinge joint are positioned as shown in Figs. 1 and 2. When in this position the rim sections 5 and 6 are interlocked and the bars 8 and 9 lying in parallel form the driving lug. The ordinary rim bolts 18' may also be used to hold the driving lug (see Fig. 7).

I prefer to lock the detachable rim section in place by the means disclosed in an application bearing Serial Number 450,290, filed March 7, 1921. Studs or projecting pins 19 and 20 carried by the ends 2 and 3 of the rim 1 are arranged for interlocking co-action with openings 21 and 22 formed in the projecting ends 23 and 24 of the rim sections 5 and 6. The extreme ends of the projecting ends 23 and 24 are arranged to abut against the respective lugs 25 and 26 provided on the ends 2 and 3 of the rim section 1. Fig. 2 shows the interlocked position of the foregoing parts and Fig. 4 is a view in collapsing or breaking position. The joints 27 formed by the ends 2 and 3 of the rim section 1 and the outer ends of the sections 5 and 6 are angularly disposed with relation to the radii of the wheel and further assist in rigidly holding the rim sections together and prevent all tendencies to rattling.

Changes in the construction and arrangement of the parts commensurate with the scope of my invention may be made and I do not limit myself to the exact disclosures herein.

I claim:

1. A tire supporting rim comprising a section having an open portion or gap therein, a detachable rim section composed of relatively short sections having their free ends extending into and secured within the aforesaid open portion for completing the rim, and a hinge connection located wholly beneath the tire supporting surface of the rim and arranged to form a staggered joint with the inner ends closely abutted at all points, said hinge connection having a portion forming a driving lug.

2. A tire supporting rim comprising a section having an open portion or gap therein, a detachable rim section composed of relatively short sections having their free ends extending into and secured within the aforesaid open portion for completing the rim, and a hinge joint including cooperating bars arranged in parallel upon the under face of the rim sections with the inner opposed faces of the said bars meeting in a longitudinal plane to form a single lug beneath the joint.

3. A tire supporting rim comprising a section having an open portion or gap therein, a detachable rim section composed of relatively short sections having their free ends extending into and secured within the aforesaid open portion for completing the rim, and a joint for hinging said inner ends of the aforesaid rim sections together, said joint including cooperating members having opposed faces arranged to meet longitudinally of the joint and adapted to form the driving lug of the rim.

4. A tire supporting rim comprising a section having an open portion or gap therein, a detachable rim section composed of relatively short sections having their free ends extending into and secured within the aforesaid open portion for completing the rim, a hinge joint for uniting the rim sections together with their inner ends abutting longitudinally and transversely of the rim in continuous contact, said hinge joint forming the driving lug, and means for securing the inner ends of the rim sections to the opposite adjacent ends thereof.

5. A rim section for automobile rims comprising relatively short tire supporting sections, a hinge joint for said sections formed of reinforcing bars secured to the said sections, said bars being arranged to meet and form a driving lug and a pin passing through said bars beneath the tire supporting surface of the rim.

6. A rim section for automobile rims comprising relatively short tire supporting sections having an opening therein, a hinge joint for said sections formed of bars secured to the respective sections and adapted to extend beyond the joint, a pin pivotally uniting said bars, and a pin provided on the end of each bar adapted to enter the aforesaid opening in the tire supporting sections.

In testimony whereof I affix my signature.

JOHN A. BEDDINGFIELD.